US006905220B2

(12) United States Patent
Wortman et al.

(10) Patent No.: US 6,905,220 B2
(45) Date of Patent: Jun. 14, 2005

(54) BACKLIGHT SYSTEM WITH MULTILAYER OPTICAL FILM REFLECTOR

(75) Inventors: David L. Wortman, St. Paul, MN (US); Sanford Cobb, Jr., St. Mary's Point, MN (US); Brian D. Cull, Maplewood, MN (US); Michael F. Weber, Shoreview, MN (US); Andrew J. Ouderkirk, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 211 days.

(21) Appl. No.: 10/051,530

(22) Filed: Jan. 22, 2002

(65) Prior Publication Data

US 2002/0141194 A1 Oct. 3, 2002

Related U.S. Application Data

(63) Continuation of application No. 08/915,553, filed on Aug. 7, 1997, now abandoned, which is a continuation of application No. 08/494,981, filed on Jun. 26, 1995, now abandoned.

(51) Int. Cl.$^7$ .............................. F21V 7/04; G02B 1/08
(52) U.S. Cl. ......................... 362/31; 362/560; 359/586
(58) Field of Search ........................ 362/31, 309, 330, 362/331, 332, 293, 584, 586, 558, 560, 561; 359/584, 586; 385/146; 349/62, 65, 67

(56) References Cited

U.S. PATENT DOCUMENTS

| | | | |
|---|---|---|---|
| 1,610,423 A | 12/1926 | Cawley | |
| 2,492,809 A | 12/1949 | Marks | |
| 3,124,639 A | 3/1964 | Kahn | |
| 3,213,753 A | 10/1965 | Rogers | |

(Continued)

FOREIGN PATENT DOCUMENTS

| | | |
|---|---|---|
| CA | 1327286 | 3/1994 |
| CH | 218041 | 12/1993 |
| DE | 4121861 | 1/1992 |
| EP | 062751 | 10/1981 |
| EP | 056843 | 8/1982 |

(Continued)

OTHER PUBLICATIONS

Schrenk et al., Nanolayer polymeric optical films, Tappi Journal, pp. 169–174, Jun. 1992.
Schrenk, W. et al., "Coextruded Elastomeric Optical Interference Film", SPE Annual Technical Conference, Atlanta, GA, pp. 1703–1707 (1988).
Schrenk et al., "Coextruded Infared Reflecting Films", 7$^{th}$ Annual Meeting Polymer Processing Society, Hamilton, Ontario, Canada, pp. 222–223 (Apr. 1991).
Schrenk et al., "Coextruded Iridescent Film", TAPPI 1976 Paper Synthetics Conf., Atlanta, GA, pp. 141–145 (Sep. 27–29, 1976).
Im, J. et al., "Coextruded Microlayer Film and Sheet", Journal of Plastic Film and Sheeting, vol. 4, pp. 104–115 (Apr., 1988).
Schrenk et al., "Coextruded Multilayer Polymer Films and Sheet", Polymer Blends, vol. 2, Ch. 15, pp. 129–165, Academic Press, Inc. (1978).
Hodgkinson, I. Et al., "Effective Principal Refractive Indices and Column Angles for Periodic Stacks of Thin Birefringement Films", J. Opt, Soc. Am. A, vol. 10, No. 9, pp. 2065–2071 (1993).

(Continued)

Primary Examiner—Alan Cariaso
Assistant Examiner—Guiyoung Lee
(74) Attorney, Agent, or Firm—Stephen W. Buckingham

(57) ABSTRACT

The present invention includes a backlight system incorporating a back reflector and/or a lamp cavity reflector constructed of a multilayer optical film.

53 Claims, 11 Drawing Sheets

U.S. PATENT DOCUMENTS

| | | |
|---|---|---|
| 3,528,723 A | 9/1970 | Rogers |
| 3,610,729 A | 10/1971 | Rogers |
| 3,647,612 A | 3/1972 | Schrenk et al. |
| 3,711,176 A | 1/1973 | Alfrey, Jr. et al. |
| 3,759,647 A | 9/1973 | Schrenk et al. |
| 3,773,882 A | 11/1973 | Schrenk |
| 3,801,429 A | 4/1974 | Schrenk et al. |
| 3,860,036 A | 1/1975 | Newman, Jr. |
| 4,025,688 A | 5/1977 | Nagy et al. |
| 4,094,947 A | 6/1978 | Alfrey, Jr. et al. |
| 4,268,127 A | 5/1981 | Oshima et al. |
| 4,310,584 A | 1/1982 | Cooper et al. |
| 4,315,258 A | 2/1982 | McKnight et al. |
| 4,427,741 A | 1/1984 | Aizawa et al. |
| 4,446,305 A | 5/1984 | Rogers et al. |
| 4,456,336 A | 6/1984 | Chung et al. |
| 4,520,189 A | 5/1985 | Rogers et al. |
| 4,521,588 A | 6/1985 | Rogers et al. |
| 4,525,413 A | 6/1985 | Rogers et al. |
| 4,540,623 A | 9/1985 | Im et al. |
| 4,648,690 A | 3/1987 | Ohe |
| 4,678,285 A | 7/1987 | Ohta et al. |
| 4,714,983 A | 12/1987 | Lang |
| 4,720,426 A | 1/1988 | Englert et al. |
| 4,729,068 A | 3/1988 | Ohe |
| 4,798,448 A | 1/1989 | van Raalte |
| 4,813,765 A | 3/1989 | Negishi |
| 4,917,465 A | 4/1990 | Conner et al. |
| 4,937,134 A | 6/1990 | Schrenk et al. |
| 4,952,023 A | 8/1990 | Bradshaw et al. |
| 5,089,318 A | 2/1992 | Shetty et al. |
| 5,094,788 A | 3/1992 | Schrenk et al. |
| 5,094,793 A | 3/1992 | Schrenk et al. |
| 5,095,210 A | 3/1992 | Wheatley et al. |
| 5,103,337 A | 4/1992 | Schrenk et al. |
| 5,111,335 A | 5/1992 | Horiuti et al. |
| 5,122,905 A | 6/1992 | Wheatley et al. |
| 5,122,906 A | 6/1992 | Wheatley |
| 5,126,880 A | 6/1992 | Wheatley et al. |
| 5,149,578 A | 9/1992 | Wheatley et al. |
| 5,157,526 A | 10/1992 | Kondo et al. |
| 5,159,478 A | 10/1992 | Akiyama et al. |
| 5,188,760 A | 2/1993 | Hikmet et al. |
| 5,202,074 A | 4/1993 | Schrenk et al. |
| 5,211,878 A | 5/1993 | Reiffenrath et al. |
| 5,217,794 A | 6/1993 | Schrenk |
| 5,233,465 A | 8/1993 | Wheatley et al. |
| 5,234,729 A | 8/1993 | Wheatley et al. |
| 5,235,443 A | 8/1993 | Barnik et al. |
| 5,255,029 A | 10/1993 | Vogeley et al. |
| 5,269,995 A | 12/1993 | Ramanathan et al. |
| 5,278,694 A | 1/1994 | Wheatley et al. |
| 5,294,657 A | 3/1994 | Melendy et al. |
| 5,303,322 A | 4/1994 | Winston et al. |
| RE34,605 E | 5/1994 | Schrenk et al. |
| 5,316,703 A | 5/1994 | Schrenk |
| 5,319,478 A | 6/1994 | Funfschilling et al. |
| 5,325,218 A | 6/1994 | Willett et al. |
| 5,333,072 A | 7/1994 | Willett |
| 5,339,198 A | 8/1994 | Wheatly et al. |
| 5,360,659 A | 11/1994 | Arends et al. |
| 5,381,309 A | 1/1995 | Borchardt |
| 5,389,324 A | 2/1995 | Lewis et al. |
| 5,408,387 A | 4/1995 | Murase et al. |
| 5,422,756 A | 6/1995 | Weber |
| 5,424,119 A | 6/1995 | Phillips et al. |
| 5,442,523 A | 8/1995 | Kashima et al. |
| 5,448,404 A | 9/1995 | Schrenk et al. |
| 5,451,449 A | 9/1995 | Shetty et al. |
| 5,467,417 A | 11/1995 | Nakamura et al. |
| 5,481,445 A | 1/1996 | Sitzema et al. |
| 5,486,935 A | 1/1996 | Kalmanash |
| 5,486,949 A | 1/1996 | Schrenk et al. |
| 5,528,720 A | 6/1996 | Winston et al. |
| 5,540,978 A | 7/1996 | Schrenk |
| 5,552,927 A | 9/1996 | Wheatly et al. |
| 5,568,316 A | 10/1996 | Schrenk et al. |
| 5,594,830 A | 1/1997 | Winston et al. |
| 5,598,280 A * | 1/1997 | Nishio et al. ................. 349/57 |
| 5,612,820 A | 3/1997 | Schrenk et al. |
| 5,629,055 A | 5/1997 | Revol et al. |
| 5,661,839 A * | 8/1997 | Whitehead ................. 385/131 |
| 5,686,979 A | 11/1997 | Weber et al. |
| 5,699,188 A | 12/1997 | Gilbert et al. |
| 5,721,603 A | 2/1998 | De Vaan et al. |
| 5,744,534 A | 4/1998 | Ishiharada et al. |
| 5,751,388 A | 5/1998 | Larson |
| 5,767,935 A | 6/1998 | Ueda et al. |
| 5,770,306 A | 6/1998 | Suzuki et al. |
| 5,783,120 A | 7/1998 | Ouderkirk et al. |
| 5,793,456 A | 8/1998 | Broer et al. |
| 5,808,794 A | 9/1998 | Weber et al. |
| 5,825,542 A | 10/1998 | Cobb, Jr. et al. |
| 5,825,543 A | 10/1998 | Ouderkirk et al. |
| 5,867,316 A | 2/1999 | Carlson et al. |
| 5,882,774 A | 3/1999 | Jonza et al. |
| 5,940,149 A | 8/1999 | Vanderwerf |
| 5,962,114 A | 10/1999 | Jonza et al. |
| 5,965,247 A | 10/1999 | Jonza et al. |
| 5,976,424 A | 11/1999 | Weber et al. |
| 5,991,077 A | 11/1999 | Carlson et al. |
| 5,999,316 A | 12/1999 | Allen et al. |
| 5,999,317 A | 12/1999 | Whitney |
| 6,012,820 A | 1/2000 | Weber et al. |
| 6,018,419 A | 1/2000 | Cobb, Jr. et al. |
| 6,024,455 A | 2/2000 | O'Neill et al. |
| 6,025,897 A | 2/2000 | Weber et al. |
| 6,031,665 A | 2/2000 | Carlson et al. |
| 6,045,894 A | 4/2000 | Jonza et al. |
| 6,049,419 A | 4/2000 | Wheatley et al. |
| 6,053,795 A | 4/2000 | Whitney et al. |
| 6,057,961 A | 5/2000 | Allen et al. |
| 6,080,467 A | 6/2000 | Weber et al. |
| 6,082,876 A | 7/2000 | Hanson et al. |
| 6,088,067 A | 7/2000 | Willett et al. |
| 6,088,159 A | 7/2000 | Weber et al. |
| 6,088,163 A | 7/2000 | Gilbert et al. |
| 6,096,247 A | 8/2000 | Ulsh et al. |
| 6,101,032 A | 8/2000 | Wortman et al. |
| 6,111,696 A | 8/2000 | Allen et al. |
| 6,111,697 A | 8/2000 | Merrill et al. |
| 6,113,811 A | 9/2000 | Kausch et al. |
| 6,117,530 A | 9/2000 | Jonza et al. |
| 6,120,026 A | 9/2000 | Whitney et al. |
| 6,124,971 A | 9/2000 | Ouderkirk et al. |
| 6,157,486 A | 12/2000 | Benson, Jr. et al. |
| 6,157,490 A | 12/2000 | Wheatley et al. |
| 6,160,663 A | 12/2000 | Merrill et al. |
| 6,179,948 B1 | 1/2001 | Merrill et al. |
| 6,207,260 B1 | 3/2001 | Wheatley et al. |
| 6,208,466 B1 | 3/2001 | Liu et al. |
| 6,256,146 B1 | 7/2001 | Merrill et al. |
| 6,288,172 B1 | 9/2001 | Goetz et al. |
| 6,297,906 B1 | 10/2001 | Allen et al. |
| 6,368,699 B1 | 4/2002 | Gilbert et al. |
| 6,531,230 B1 | 3/2003 | Weber et al. |
| 6,569,515 B2 | 5/2003 | Hebrink et al. |
| 2002/0064671 A1 | 5/2002 | Hebrink et al. |

FOREIGN PATENT DOCUMENTS

| | | |
|---|---|---|
| EP | 469732 | 2/1992 |

| | | |
|---|---|---|
| EP | 514223 | 11/1992 |
| EP | 552725 | 7/1993 |
| EP | 573905 | 12/1993 |
| EP | 597261 | 5/1994 |
| EP | 606939 | 7/1994 |
| EP | 606940 | 7/1994 |
| GB | 2052779 | 1/1981 |
| JP | 63-168604 | 7/1988 |
| JP | 63-181201 | 7/1988 |
| JP | 4-141603 | 5/1992 |
| JP | 4-184429 | 7/1992 |
| JP | 5-288910 | 11/1993 |
| JP | 6-11607 | 1/1994 |
| WO | WO 91/09719 | 7/1991 |
| WO | WO 94/11776 | 5/1994 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 95/19347 | 12/1995 |
| WO | WO 97/01440 | 1/1997 |
| WO | WO 97/01774 | 1/1997 |
| WO | WO 97/32226 | 9/1997 |
| WO | WO 99/36477 | 7/1999 |
| WO | WO 99/36804 | 7/1999 |
| WO | WO 00/07044 | 2/2000 |

OTHER PUBLICATIONS

Wu et al., "High Transparent Sheet Polarizer Made with Birefringent Materials", Jpn. J. of App. Phys., vol. 34, pp. L. 997–999, part 2, No. 8A (Aug. 1995).

Schrenk et al., "Interfacial Flow Instability In Multilayer Coextrusion", Polymer Engineering and Science, vol.18 (8), pp. 620–623 (Jun. 1978).

Schrenk, W., "New Developments in Coextrusion", International Conference on Advances in Polymer Processing, New Orleans, Louisiana, (Apr., 1991).

Alfrey, Jr. et al., "Physical Optics of Iridescent Multilayered Plastic Films", Polymer Engineering and Science, vol. 9, No. 6, pp. 400–404 (Nov. 1969).

Radford et al., "Reflectivity of Iridescent Coextruded Multilayered Plastic Films", "Reflectivity of Iridescent Coextruded Multilayered Plastic Films", Polymer Engineering and Science, vol. 13, No. 3, (May 1973); Dow Chemical Co. American Chemical Society Symposium on "Coextruded Plastic Films, Fibers, Composites", Apr. 9–14, 1972.

Weber, M., "23:3: Retroreflecting Sheet Polarizer", SID 92 Digest, pp. 427–429 (1992).

Weber, M., "P–61: Retroreflecting Sheet Polarizer", SID 93 Digest, pp. 669–672 (1973).

Weber, M., Giant Birefringement Optics in Multilayer Polymer Mirrors, Science, Mar. 31, 2000, vol. 287, No. 5462, pp. 2451–2456.

Zang, D. Y., Giant anisotropies in the dielectric properties of quasi–epitaxial crystalline organic semiconductor thin films, 1991 American Institute of Physics, Appl. Physics, Lett. 59, Aug. 12, 1991, pp. 823–825.

Boese, D., "Chain Orientation and Anisotropies in Optical and Dielectric Properties in Thin Films of Stiff Polyimides," Journal of Polymer Science, Part B, Polymer Physics, vol. 30, 1321–1327.

* cited by examiner

BACKLIGHT SYSTEM WITH MULTILAYER OPTICAL FILM REFLECTOR

This is a continuation of application Ser. No. 08/915,553 filed Aug. 7, 1997, now abandoned which is a continuation of Ser. No. 08/494,981, filed Jun. 26, 1995, now abandoned.

TECHNICAL FIELD

The present invention relates to the field of backlight systems. More particularly, the present invention relates to improved backlight systems with multilayer optical film reflectors.

BACKGROUND OF THE INVENTION

Liquid crystal (LC) displays are widely used for laptop computers, handheld calculators, digital watches, and similar devices in which information must be displayed to a viewer. In many applications, the displays incorporate a backlight to provide the light necessary to view the display when ambient light entering the display and reflected back out of the display is insufficient.

Backlight systems typically incorporate a light source and a light guide to direct light from the source and uniformly spread it over the display. Traditionally, light guides have been provided of light transparent material which propagate light along their length through total internal reflection. The light is typically reflected off of the back surface of the light guide and towards the front surface at angles which allow it to exit the front surface of the light guide. Various reflection mechanisms are used to distribute the light exiting the guide uniformly including reflective dots, channels, facets etc.

Backlight systems which use non-collimated light sources such as fluorescent lamps, etc. also typically incorporate at least two reflectors. A lamp cavity mirror is typically used to reflect light exiting the light source in a direction away from the light guide back towards the guide. This reflector can be specular or diffuse, although it is typically specular.

A second reflector is provided proximate the back surface of the light guide to reflect light escaping from the back surface of the light guide and redirect it towards the front surface of the light guide where it can be transmitted to the viewer. These reflectors are typically constructed of a reflective white coating that also diffuse the reflected light over a Lambertian distribution.

A primary disadvantage with the conventional reflectors used in the lamp cavity and at the back surface of the light guide is, however, their relatively high absorptivities and high transmission of incident light. Typical reflectors will absorb or transmit about 4 to about 15% of the light incident upon them. The absorbed light is, of course, not available to the viewer, thereby degrading performance of the backlight.

The absorptive losses are, of course, increased with every reflection of light from the surface of conventional reflectors. With even the best conventional reflectors which absorb 4% of incident light, the intensity level of reflected light is about 81.5% after only five reflections.

These absorptive losses are also substantially increased when the backlight is used in combination with various light recycling films such as a structured partially reflective film. One micro-replicated structured partially reflective film is available as OPTICAL LIGHTING FILM from Minnesota Mining and Manufacturing Company, St. Paul, Minn.

Structured partially reflective films typically have excellent reflectivity over certain ranges of angles but high transmission over others. Micro-replicated structured partially reflective films are available as Brightness Enhancement Film, available from Minnesota Mining and Manufacturing Company. In general, structured partially reflective films redirect and transmit light into a relatively narrow range of angles while reflecting the remainder of the light. As a result, structured films transmit light and enhance brightness in backlight systems by recycling light which would otherwise exit a backlight outside a normal viewing angle.

Although recycling light in that manner is generally desired, it is a disadvantage when combined with conventional reflectors because a portion of the light which is reflected back into the light guide is absorbed or transmitted by the conventional back reflectors. Those increased absorption losses reduce the luminance or brightness attainable by this combination of the backlight system.

SUMMARY OF THE INVENTION

The present invention includes a backlight system incorporating a back reflector and/or a lamp cavity reflector constructed of a multilayer optical film.

Providing the multilayer optical film for lamp cavity mirrors and/or back reflectors in backlight systems according to the present invention provides a number of advantages. One advantage is the low absorptivity of the film. The multilayer optical film according to the present invention can reflect over 99% of the light striking the surface of the film.

Another advantage is that the multilayer optical film is also highly efficient at reflecting light whether it is incident normal to the film surface or off-axis.

Yet another advantage of backlight systems employing multilayer optical film reflectors is that the multilayer optical film is relatively low in weight as compared to many conventional reflectors.

Still another advantage of backlight systems employing multilayer optical film back reflectors is that because the film is relatively thin as compared to many conventional reflectors, the backlight systems can be thinner than a backlight system employing a convention back reflector.

Still a further advantage is that an entire light guide can be constructed using multilayer optical film according to the present invention for both the front and back surfaces of the light guide, thereby eliminating the need for a separate light guide and further reducing the cost, weight and bulk of backlight systems.

Backlight systems according to the present invention can also incorporate recycling technologies, such as structured films and/or reflective polarizers, without incurring the significant absorptive losses associated with conventional reflectors.

Another advantage is that the multilayer optical film is nonconductive, and cannot inductively couple with the lamp.

These and other features and advantages of backlight assemblies according to the present invention will become apparent on reading the detailed description below together with reference to the drawings.

DETAILED DESCRIPTION OF THE INVENTION

I. Multilayer Optical Film

The backlight systems described herein rely on the unique and advantageous properties of multilayer optical films. The advantages, characteristics and manufacturing of such films are most completely described in the above mentioned copending and commonly assigned U.S. patent application Ser. No. 08/402,041, filed Mar. 10, 1995, titled OPTICAL FILM, which is incorporated herein by reference. The multilayer optical film is useful, for example, as highly efficient mirrors and/or polarizers. A relatively brief description of the properties and characteristics of the multilayer optical film is presented below followed by a description of illustrative embodiments of backlight systems using the multilayer optical film according to the present invention.

Multilayer optical films as used in conjunction with the present invention exhibit relatively low absorption of incident light, as well as high reflectivity for off-axis as well as normal light rays. These properties generally hold whether the films are used for pure reflection or reflective polarization of light. The unique properties and advantages of the multi-layer optical film provides an opportunity to design highly efficient backlight systems which exhibit low absorption losses when compared to known backlight systems.

Figure 1A:
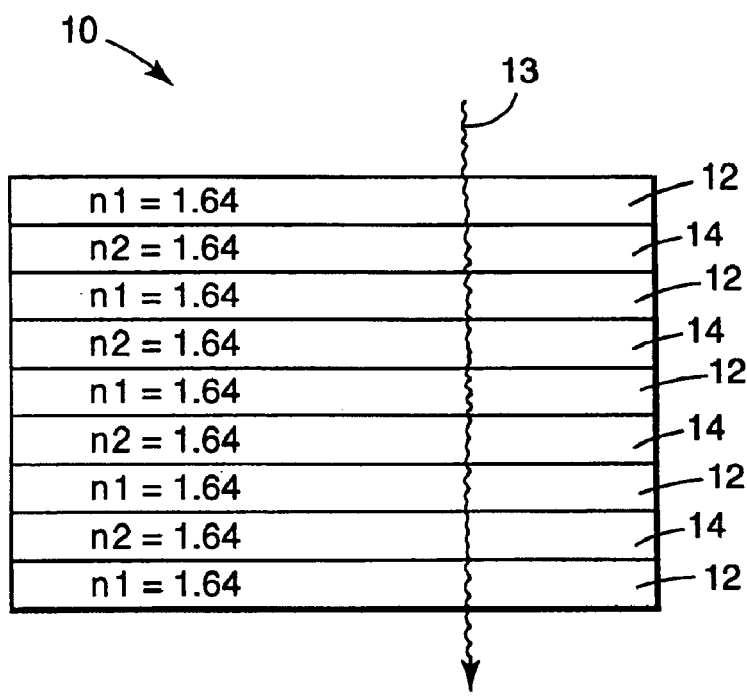
FIGS. 1a and 1b are diagrammatical views of the multilayer optical film of the present invention.
Figure 1B:
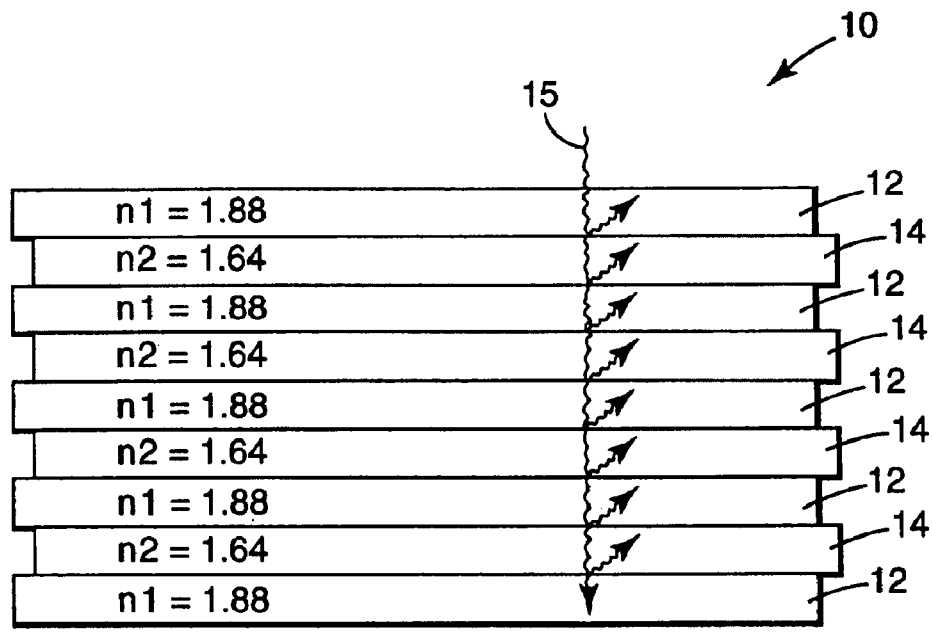

An exemplary multilayer optical film of the present invention as illustrated in FIGS. 1A and 1B includes a multilayer stack 10 having alternating layers of at least two materials 12 and 14. At least one of the materials has the property of stress induced birefringence, such that the index of refraction (n) of the material is affected by the stretching process. FIG. 1A shows an exemplary multilayer stack before the stretching process in which both materials have the same index of refraction. Light ray 13 experiences no index of refraction change and passes through the stack. In FIG. 1B, the same stack has been stretched, thus increasing the index of refraction of material 12. The difference in refractive index at each boundary between layers will cause part of ray 15 to be reflected. By stretching the multilayer stack over a range of uniaxial to biaxial orientation, a film is created with a range of reflectivities for differently oriented plane-polarized incident light. The multilayer stack can thus be made useful as reflective polarizers or mirrors.

Multilayer optical films constructed according to the present invention exhibit a Brewster angle (the angle at which reflectance goes to zero for light incident at any of the layer interfaces) which is very large or is nonexistent. In contrast, known multilayer polymer films exhibit relatively small Brewster angles at layer interfaces, resulting in transmission of light and/or undesirable iridescence. The multilayer optical films according to the present invention, however, allow for the construction of mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

Figure 2:
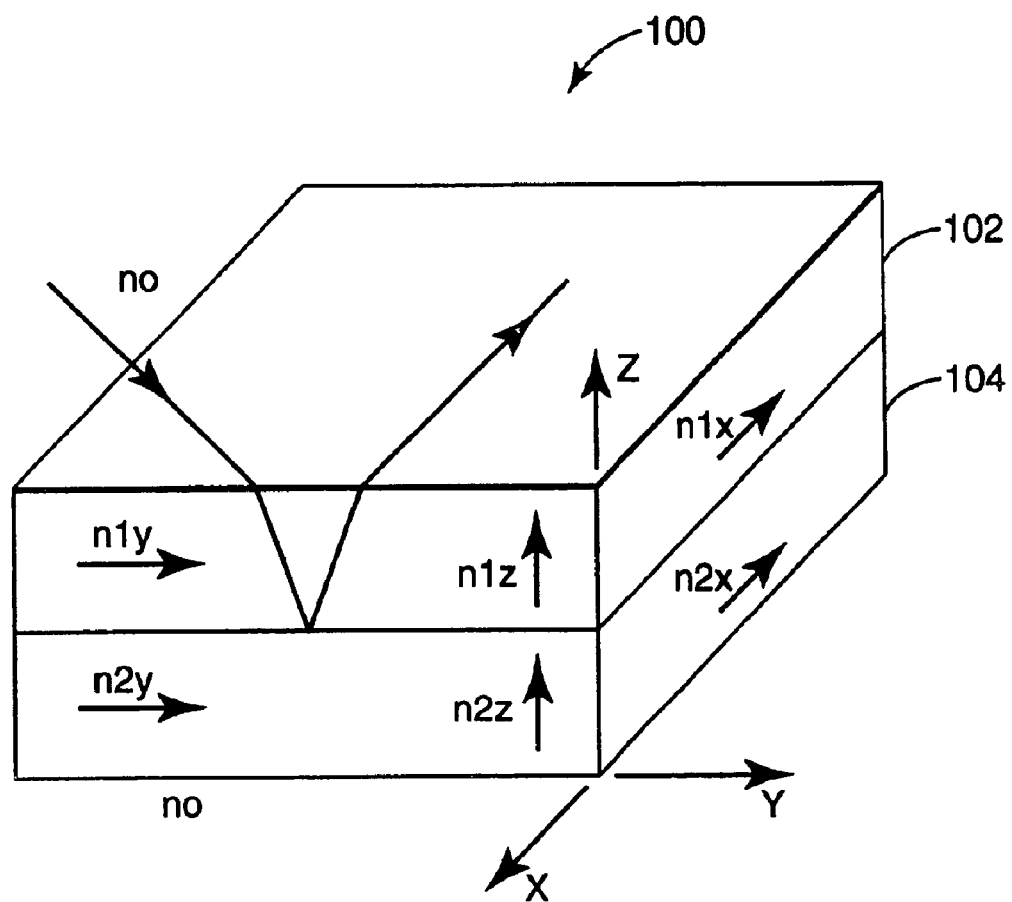
FIG. 2 shows a two layer stack of films forming a single interface.

FIG. 2 shows two layers of a multilayer stack, and indicates the three dimensional indices of refraction for each layer. The indices of refraction for each layer are $n1x$, $n1y$, and $n1z$ for layer 102, and $n2x$, $n2y$, and $n2z$ for layer 104. The relationships between the indices of refraction in each film layer to each other and to those of the other layers in the film stack determine the reflectance behavior of the multilayer stack at any angle of incidence, from any azimuthal direction. The principles and design considerations described in U.S. patent application Ser. No. 08/402,041 can be applied to create multilayer stacks having the desired optical effects for a wide variety of circumstances and applications. The indices of refraction of the layers in the multilayer stack can be manipulated and tailored to produce the desired optical properties.

Referring again to FIG. 1B, the multilayer stack 10 can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

The preferred multilayer stack is comprised of low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers in the multilayer stack having an average thickness of not more than 0.5 microns.

In those applications where reflective films (e.g. mirrors) are desired, the desired average transmission for light of each polarization and plane of incidence generally depends upon the intended use of the reflective film. One way to produce a multilayer mirror film is to biaxially stretch a multilayer stack which contains a birefringent material as the high index layer of the low/high index pair. For a high efficiency reflective film, average transmission along each stretch direction at normal incidence over the visible spectrum (400–700 nm) is desirably less than 10% (reflectance greater than 90%), preferably less than 5% (reflectance greater than 95%), more preferably less than 2% (reflectance, greater than 98%), and even more preferably less than 1% (reflectance greater than 99%). The average transmission at 60 degrees from the normal from 400–700 nm is desirably less than 20% (reflectance greater than 80%), preferably less than 10% (reflectance greater than 90%), more preferably less than 5% (reflectance greater than 95%), and even more preferably less than 2% (reflectance greater than 98%), and even more preferably less than 1% (reflectance greater than 99%).

In addition, asymmetric reflective films may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400–700 nm), or over the visible spectrum and into the near infrared (e.g., 400–850 nm).

Multilayer optical films can also be designed to operate as reflective polarizers. One way to produce a multilayer reflective polarizer is to uniaxially stretch a multilayer stack which contains a birefringent material as the high index layer of the low/high index pair. The resulting reflective polarizers have high reflectivity for light with its plane of polarization parallel to one axis (in the stretch direction) for a broad range of angles of incidence, and simultaneously have low reflectivity and high transmissivity for light with its plane of polarization parallel to the other axis (in the non-stretch direction) for a broad range of angles of incidence. By controlling the three indices of refraction of each film, nx, ny and nz, the desired polarizer behavior can be obtained.

For many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest.

The average transmission at normal incidence for a polarizer in the transmission axis across the visible spectrum (400–700 nm for a bandwidth of 300 nm) is desirably at least 50%, preferably at least 70%, more preferably at least 85%, and even more preferably at least 90%. The average transmission at 60 degrees from the normal (measured along the transmission axis for p-polarized light) for a polarizer from 400–700 nm is desirably at least 50%, preferably at least 70%, more preferably at least 80%, and even more preferably at least 90%.

The average transmission for a multilayer reflective polarizer at normal incidence for light polarized in the direction of the extinction axis across the visible spectrum (400–700 nm for a bandwidth of 300 nm) is desirably at less than 50%, preferably less than 30%, more preferably less than 15%, and even more preferably less than 5%. The average transmission at 60 degrees from the normal (measured along the transmission axis for p-polarized light) for a polarizer for light polarized in the direction of the extinction axis from 400–700 nm is desirably less than 50%, preferably less than 30%, more preferably less than 15%, and even more preferably less than 5%.

For certain applications, high reflectivity for p-polarized light with its plane of polarization parallel to the transmission axis at off-normal angles are preferred. The average reflectivity for light polarized along the transmission axis should be more than 20% at an angle of at least 20 degrees from the normal.

In addition, although reflective polarizing films and asymmetric reflective films are discussed separately herein, it should be understood that two or more of such films could be provided to reflect substantially all light incident on them (provided they are properly oriented with respect to each other to do so). This construction is typically desired when the multilayer optical film is used as a reflector in a backlight system according to the present invention.

If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. The % RMS color, can be determined according to the equation:

$$C_{RMS} = \frac{\int_{\lambda 1}^{\lambda 2} ((T - \overline{T})^2)^{1/2} d\lambda}{\overline{T}}$$

where the range λ1 to λ2 is the wavelength range, or bandwidth, of interest, T is the transmissivity along the transmission axis, and $\overline{T}$ is the average transmissivity along the transmission axis in the wavelength range of interest. For applications where a low color polarizer is desirable, the % RMS color should be less than 10%, preferably less than 8%, more preferably less than 3.5%, and even more preferably less than 2% at an angle of at least 30 degrees from the normal, preferably at least 45 degrees from the normal, and even more preferably at least 60 degrees from the normal.

Preferably, a reflective polarizer combines the desired % RMS color along the transmission axis for the particular application with the desired amount of reflectivity along the extinction axis across the bandwidth of interest. For polarizers having a bandwidth in the visible range (400–700 nm, or a bandwidth of 300 nm), average transmission along the extinction axis at normal incidence is desirably less than 40%, more desirably less than 25%, preferably less than 15%, more preferably less than 5% and even more preferably less than 3%.

Materials Selection and Processing

With the design considerations described in the above mentioned U.S. patent application Ser. No. 08/402,041, one of ordinary skill will readily appreciate that a wide variety of materials can be used to form multilayer reflective films or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite of the first material. Or, the second material may have no birefringence, or less birefringence than the first material.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

Particularly preferred combinations of layers in the case of polarizers include PEN/co-PEN, polyethylene terephthalate (PET)/co-PEN, PEN/sPS, PET/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co.

Particularly preferred combinations of layers in the case of reflective films include PET/Ecdel, PEN/Ecdel, PEN/sPS, PEN/THV, PEN/co-PET, and PET/sPS, where "co-PET" refers to a copolymer or blend based upon terephthalic acid (as described above), Ecdel is a thermoplastic polyester commercially available from Eastman Chemical Co., and THV is a fluoropolymer commercially available from Minnesota Mining and Manufacturing Company, St. Paul, Minn.

The number of layers in the film is selected to achieve the desired optical properties using the minimum number of layers for reasons of film thickness, flexibility and economy. In the case of both polarizers and reflective films, the number of layers is preferably less than 10,000, more preferably less than 5,000, and even more preferably less than 2,000.

As discussed above, the ability to achieve the desired relationships among the various indices of refraction (and thus the optical properties of the multilayer film) is influenced by the processing conditions used to prepare the multilayer film. In the case of organic polymers which can be oriented by stretching, the films are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of reflective films the film is stretched substantially in two directions (biaxial orientation).

The film may be allowed to dimensionally relax in the cross-stretch direction from the natural reduction in cross-stretch (equal to the square root of the stretch ratio); it may simply be constrained to limit any substantial change in cross-stretch dimension; or it may be actively stretched in the cross-stretch dimension. The film may be stretched in the machine direction, as with a length orienter, or in width using a tenter.

The pre-stretch temperature, stretch temperature, stretch rate, stretch ratio, heat set temperature, heat set time, heat set relaxation, and cross-stretch relaxation are selected to yield a multilayer film having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer film. In general, however, a stretch ratios in the range from 1:2 to 1:10 (more preferably 1:3 to 1:7) in the stretch direction and from 1:0.2 to 1:10 (more preferably from 1:0.3 to 1:7) orthogonal to the stretch direction is preferred.

Suitable multilayer films may also be prepared using techniques such as spin coating (e.g., as described in Boese et al., J. Polym. Sci.: Part B, 30:1321 (1992) for birefringent polyimides, and vacuum deposition (e.g., as described by Zang et. al., Appl. Phys. Letters, 59:823 (1991) for crystalline organic compounds; the latter technique is particularly useful for certain combinations of crystalline organic compounds and inorganic materials.

Exemplary multilayer reflective mirror films and multilayer reflective polarizers will now be described in the following examples.

EXAMPLE 1 (PEN:THV 500, 449, Mirror)

A coextruded film containing 449 layers was made by extruding the cast web in one operation and later orienting the film in a laboratory film-stretching apparatus. A Polyethylene naphthalate (PEN) with an Intrinsic Viscosity of 0.53 dl/g (60 wt. % phenol/40 wt. % dichlorobenzene) was delivered by one extruder at a rate of 56 pounds per hour and THV 500 (a fluoropolymer available from Minnesota Mining and Manufacturing Company) was delivered by another extruder at a rate of 11 pounds per hour. The PEN was on the skin layers and 50% of the PEN was present in the two skin layers. The feedblock method was used to generate 57 layers which was passed through three multipliers producing an extrudate of 449 layers. The cast web was 20 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 140° C. in 60 seconds. Stretching then commenced at 10%/sec (based on original dimensions) until the sample was stretched to about 3.5×3.5. Immediately after the stretching the sample was cooled by blowing room temperature air at it.

Figure 3:
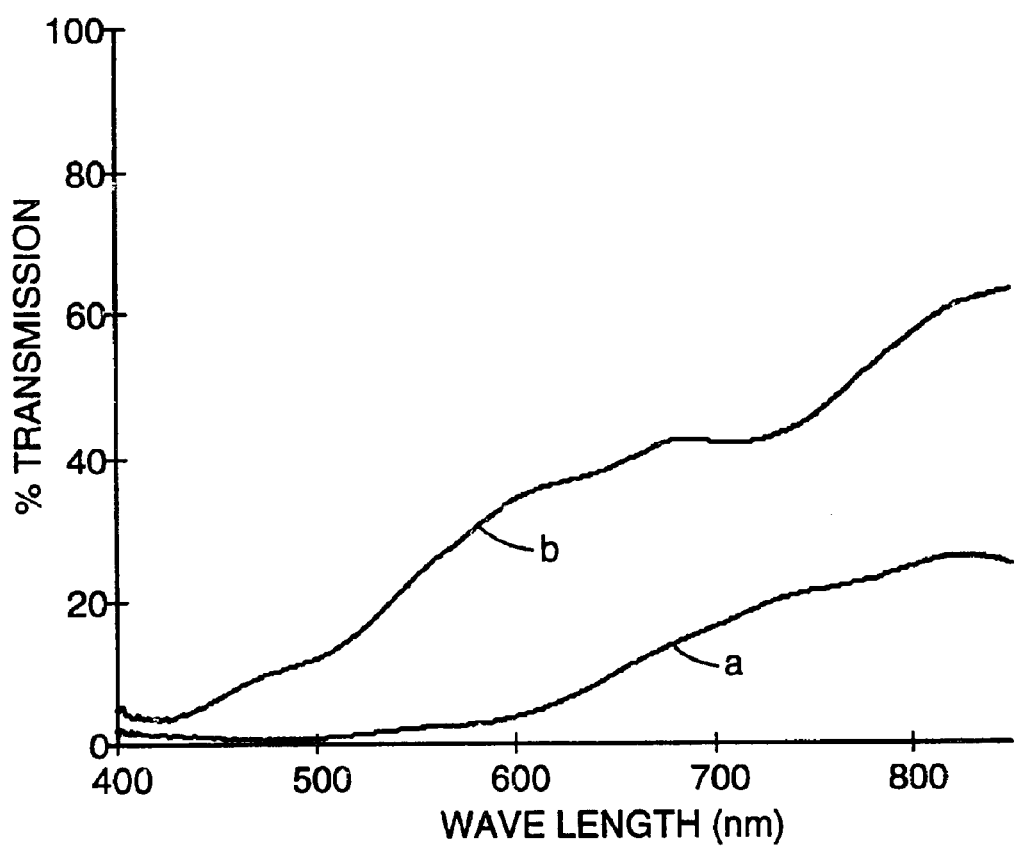
FIGS. 3–6, 7A and 7B depict the optical performance of multilayer mirrors given in Examples 1–5.

FIG. 3 shows the transmission of this multilayer film. Curve (a) shows the response at normal incidence, while curve (b) shows the response at 60 degrees for p-polarized light.

EXAMPLE 2 (PEN:PMMA, 601, Mirror)

A coextruded film containing 601 layers was made on a sequential flat-film-making line via a coextrusion process. Polyethylene Naphthalate (PEN) with an Intrinsic Viscosity of 0.57 dl/g (60 wt. % phenol/40 wt. % dichlorobenzene) was delivered by extruder A at a rate of 114 pounds per hour with 64 pounds per hour going to the feedblock and the rest going to skin layers described below. PMMA (CP-82 from ICI of Americas) was delivered by extruder B at a rate of 61 pounds per hour with all of it going to the feedblock. PEN was on the skin layers of the feedblock. The feedblock method was used to generate 151 layers using the feedblock such as those described in U.S. Pat. No. 3,801,429, after the feedblock two symmetric skin layers were coextruded using extruder C metering about 30 pounds per hour of the same type of PEN delivered by extruder A. This extrudate passed through two multipliers producing an extrudate of about 601 layers. U.S. Pat. No. 3,565,985 describes similar coextrusion multipliers. The extrudate passed through another device that coextruded skin layers at a total rate of 50 pounds per hour of PEN from extruder A. The web was length oriented to a draw ratio of about 3.2 with the web temperature at about 280° F. The film was subsequently preheated to about 310° F. in about 38 seconds and drawn in the transverse direction to a draw ratio of about 4.5 at a rate of about 11% per second. The film was then heat-set at 440° F. with no relaxation allowed. The finished film thickness was about 3 mil.

Figure 4:
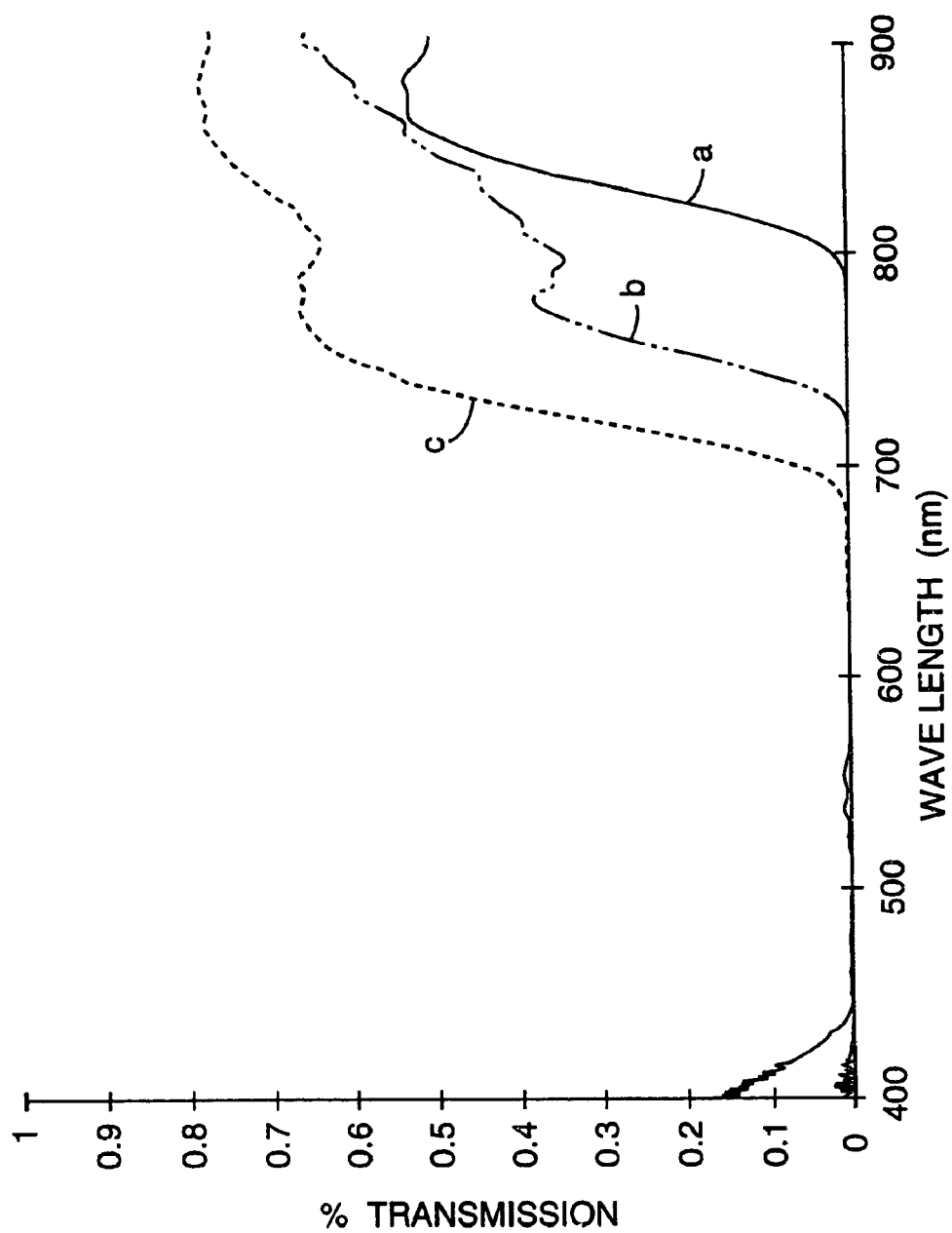

As seen in FIG. 4, curve (a), the bandwidth at normal incidence is about 350 nm with an average in-band extinction of greater than 99%. The amount of optical absorption is difficult to measure because of its low value, but is less than 1%. At an incidence angle of 50° from the normal both s (curve (b)) and p-polarized (curve (c)) light showed similar extinctions, and the bands were shifted to shorter wavelengths as expected. The red band-edge for s-polarized light is not shifted to the blue as much as for p-polarized light due to the expected larger bandwidth for s-polarized light, an due to the lower index seen by the p-polarized light in the PEN layers.

EXAMPLE 3 (PEN:PCTG, 449, Polarizer)

A coextruded film containing 481 layers was made by extruding the cast web in one operation and later orienting the film in a laboratory film-stretching apparatus. The feedblock method was used with a 61 layer feedblock and three (2×) multipliers. Thick skin layers were added between the final multiplier and the die. Polyethylene naphthalate (PEN) with an intrinsic viscosity of 0.47 dl/g (60 wt. % phenol/40 wt. % dichlorobenzene) was delivered to the feedblock by one extruder at a rate of 25.0 pounds per hour. Glycol modified polyethylene dimethyl cyclohexane terephthalate (PCTG 5445 from Eastman) was delivered by another extruder at a rate of 25.0 pounds per hour. Another stream of PEN from the above extruder was added as skin layers after the multipliers at a rate of 25.0 pounds per hour. The cast web was 0.007 inches thick and 12 inches wide. The web was layer uniaxially oriented using a laboratory stretching device that uses a pantograph to grip a section of film and stretch it in one direction at a uniform rate while it is allowed to freely relax in the other direction. The sample of web loaded was about 5.40 cm wide (the unconstrained direction) and 7.45 cm long between the grippers of the pantograph. The web was loaded into the stretcher at about 100° C. and heated to 135° C. for 45 seconds. Stretching was then commenced at 20%/second (based on original dimensions) until the sample was stretched to about 6:1 (based on gripper to gripper measurements). Immediately after stretching, the sample was cooled by blowing room temperature air at it. In the center, the sample was found to relax by a factor of 2.0.

Figure 5:
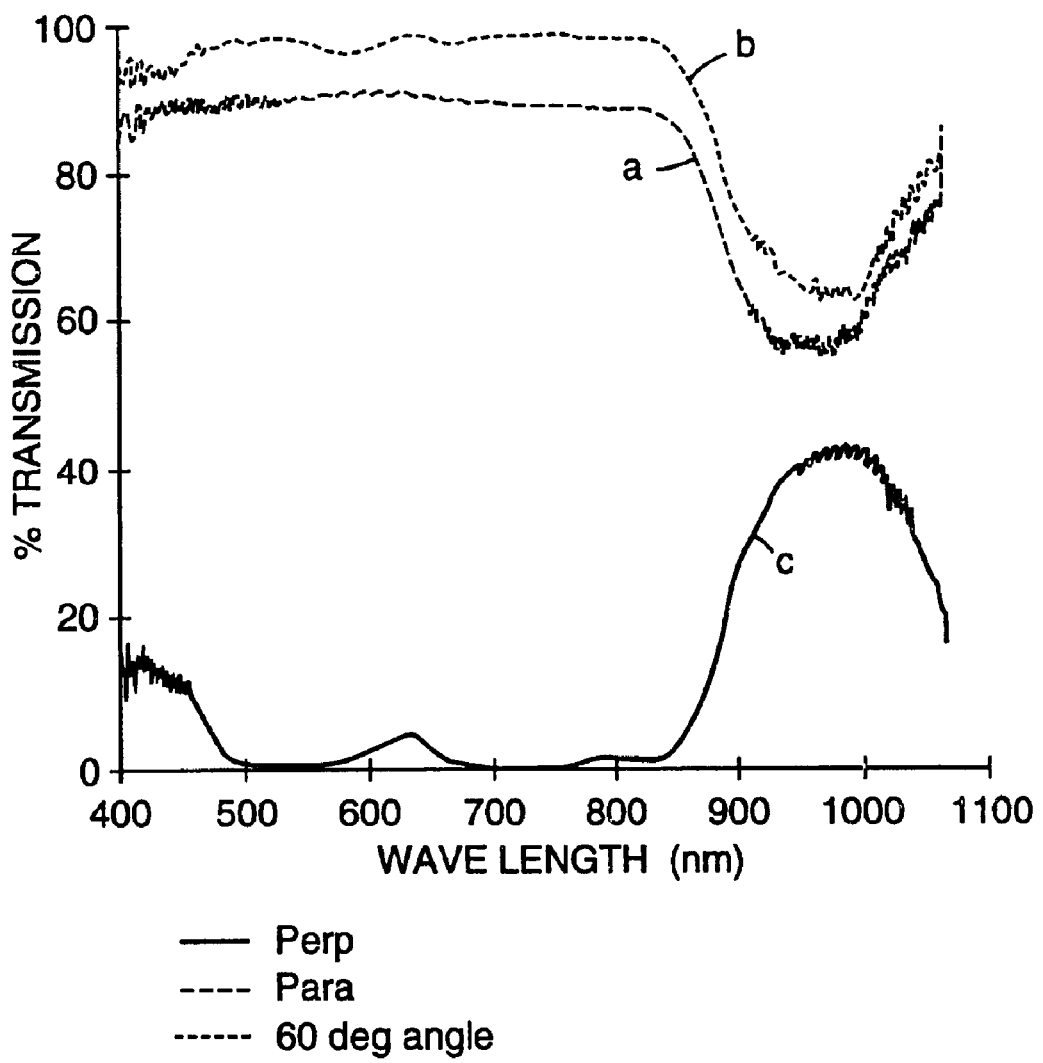

FIG. 5 shows the transmission of this multilayer film where curve a shows transmission of light polarized in the non-stretch direction at normal incidence, curve b shows transmission of p-polarized light polarized in the non-stretched direction at 60° incidence, and curve c shows the transmission of light polarized in the stretch direction at normal incidence. Average transmission for curve a from 400–700 nm is 89.7%, average transmission for curve b from 400–700 nm is 96.9%, and average transmission for curve c from 400–700 nm is 4.0%. % RMS color for curve a is 1.05%, and %RMS color for curve b is 1.44%.

EXAMPLE 4 (PEN:CoPEN, 601, Polarizer)

A coextruded film containing 601 layers was made on a sequential flat-film-making line via a coextrusion process. A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene dicarboxylate methyl ester, 15% dimethyl isophthalate and 15% dimethyl terephthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. The PEN skin layers were coextruded on the outside of the optical stack with a total thickness of 8% of the coextruded layers. The optical stack was multiplied by two sequential multipliers. The nominal multiplication ratio of the multipliers were 1.2 and 1.27, respectively. The film was subsequently preheated to 310° F. in about 40 seconds and drawn in the transverse direction to a draw ratio of about 5.0 at a rate of 6% per second. The finished film thickness was about 2 mils.

Figure 6:
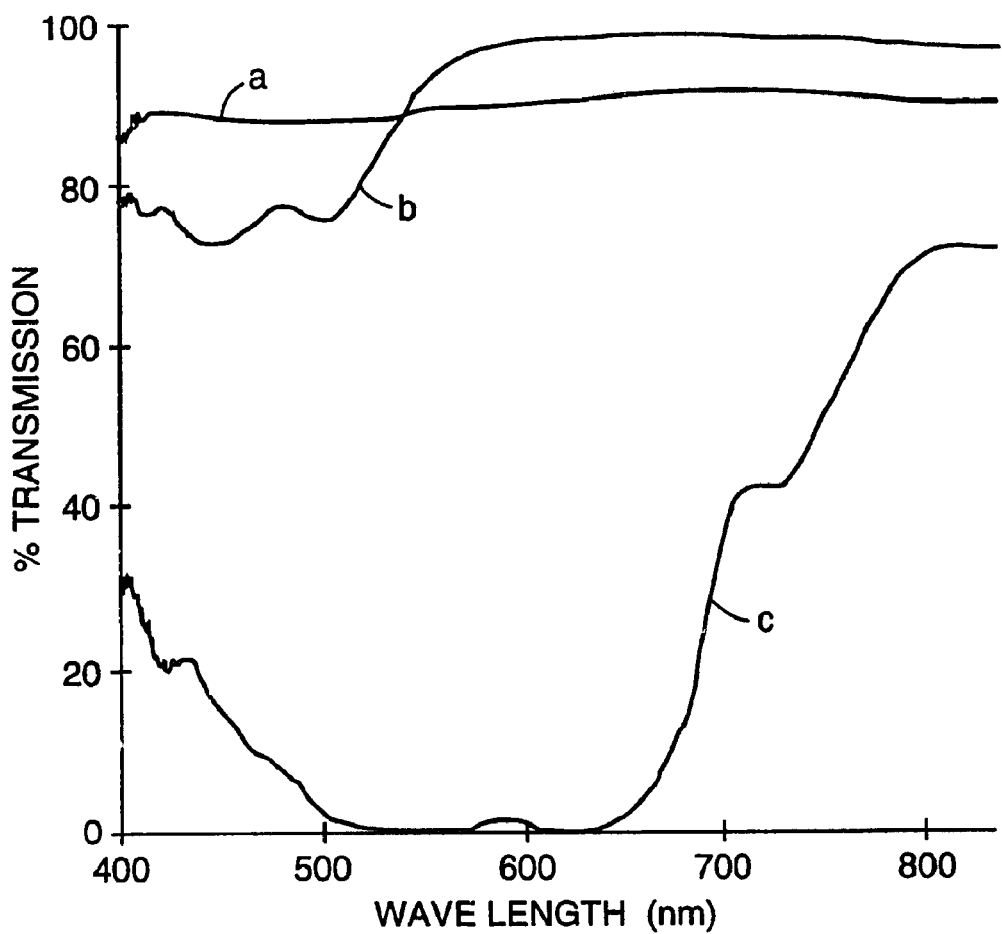

FIG. 6 shows the transmission for this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light in the non-stretch direction at both normal and 60° incidence (80–100%). Also note the very high reflectance of light polarized in the stretched direction in the visible range (400–700 nm) shown by curve c. Reflectance is nearly 99% between 500 and 650 nm.

EXAMPLE 5 (PEN:sPS, 481, Polarizer)

A 481 layer multilayer film was made from a polyethylene naphthalate (PEN) with an intrinsic viscosity of 0.56 dl/g measured in 60 wt. % phenol and 40 wt % dichlorobenzene purchased from Eastman Chemicals and a syndiotactic polystyrene (sPS) homopolymer (weight average molecular weight=200,000 Daltons, sampled from Dow Corporation). The PEN was on the outer layers and was extruded at 26 pounds per hour and the sPS at 23 pounds per hour. The feedblock used produced 61 layers with each of the 61 being approximately the same thickness. After the feedblock three (2x) multipliers were used. Equal thickness skin layers containing the same PEN fed to the feedblock were added after the final multiplier at a total rate of 22 pounds per hour. The web was extruded through a 12" wide die to a thickness of about 0.011 inches (0.276 mm). The extrusion temperature was 290° C.

This web was stored at ambient conditions for nine days and then uniaxially oriented on a tenter. The film was preheated to about 320° F. (160° C.) in about 25 seconds and drawn in the transverse direction to a draw ratio of about 6:1 at a rate of about 28% per second. No relaxation was allowed in the stretched direction. The finished film thickness was about 0.0018 inches (0.046 mm).

Figure 7A:
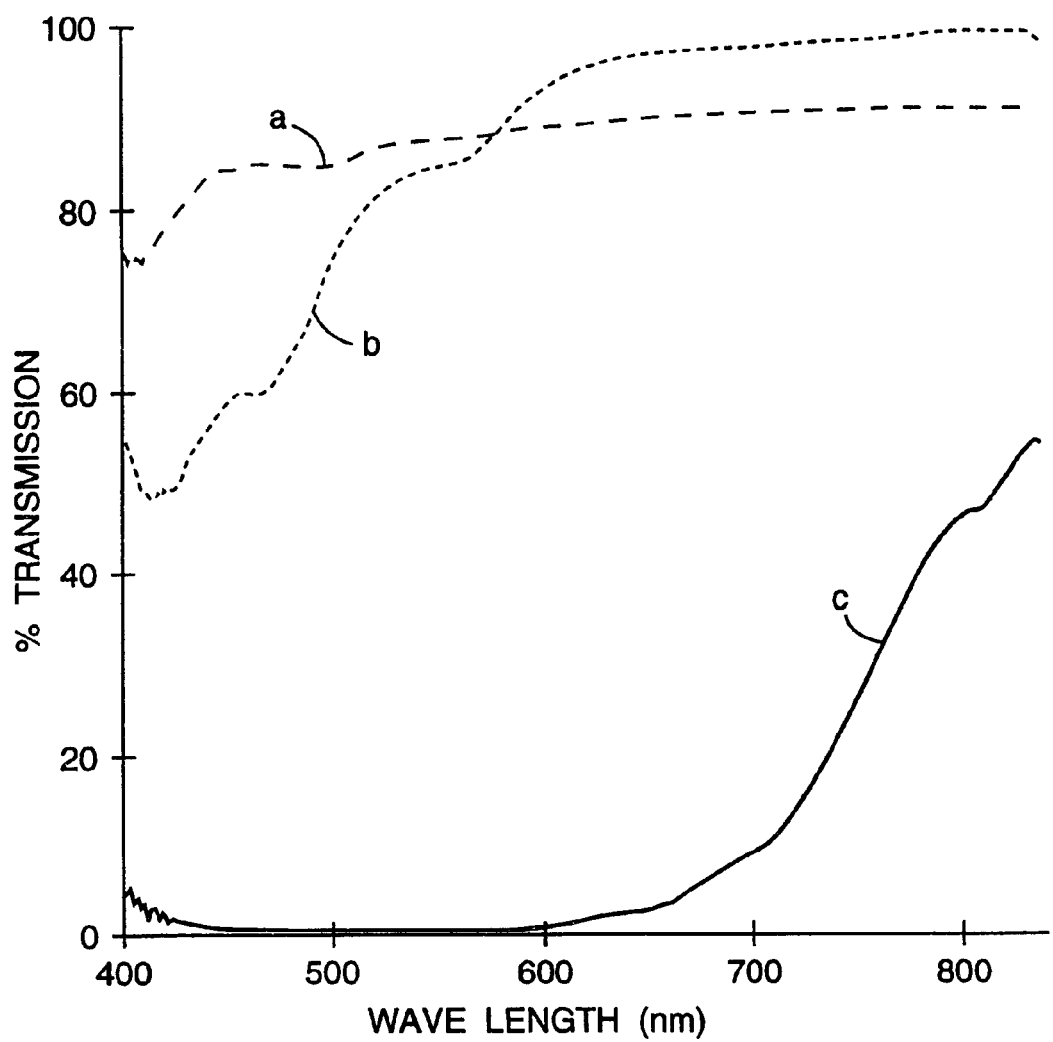

FIG. 7A shows the optical performance of this PEN:sPS reflective polarizer containing 481 layers. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence. Average transmission for curve a over 400–700 nm is 86.2%, the average transmission for curve b over 400–700 nm is 79.7%. Also note the very high reflectance of light polarized in the stretched direction in the visible range (400–700 nm) shown by curve c. The film has an average transmission of 1.6% for curve c between 400 and 700 nm. The % RMS color for curve a is 3.2%, while the % RMS color for curve b is 18.2%.

EXAMPLE 6 (PEN:coPEN, 603, Polarizer)

A reflecting polarizer comprising 603 layers was made on a sequential flat-film making line via a coextrusion process. A polyethylene naphthalate (PEN) with an intrinsic viscosity of 0.47 dl/g (in 60 wt % phenol plus 40 wt % dichlorobenzene) was delivered by an extruder at a rate of 83 pounds (38 kg) per hour and the CoPEN was delivered by another extruder at 75 pounds (34 kg) per hour. The CoPEN was a copolymer of 70 mole %, 2,6 naphthalene dicarboxylate methyl ester, 15 mole % dimethyl terephthalate, and 15 mole % dimethyl isophthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. This optical stack was multiplied by two sequential multipliers. The nominal multiplication ratio of the multipliers was 1.2 and 1.4, respectively. Between the final multiplier and the die, skin layers were added composed of the same CoPEN described above, delivered by a third extruder at a total rate of 106 pounds (48 kg) per hour. The film was subsequently preheated to 300° F. (150° C.) in about 30 seconds and drawn in the transverse direction to a draw ratio of approximately 6 at an initial rate of about 20% per second. The finished film thickness was approximately 0.0035 inch (0.089 mm).

Figure 7B:
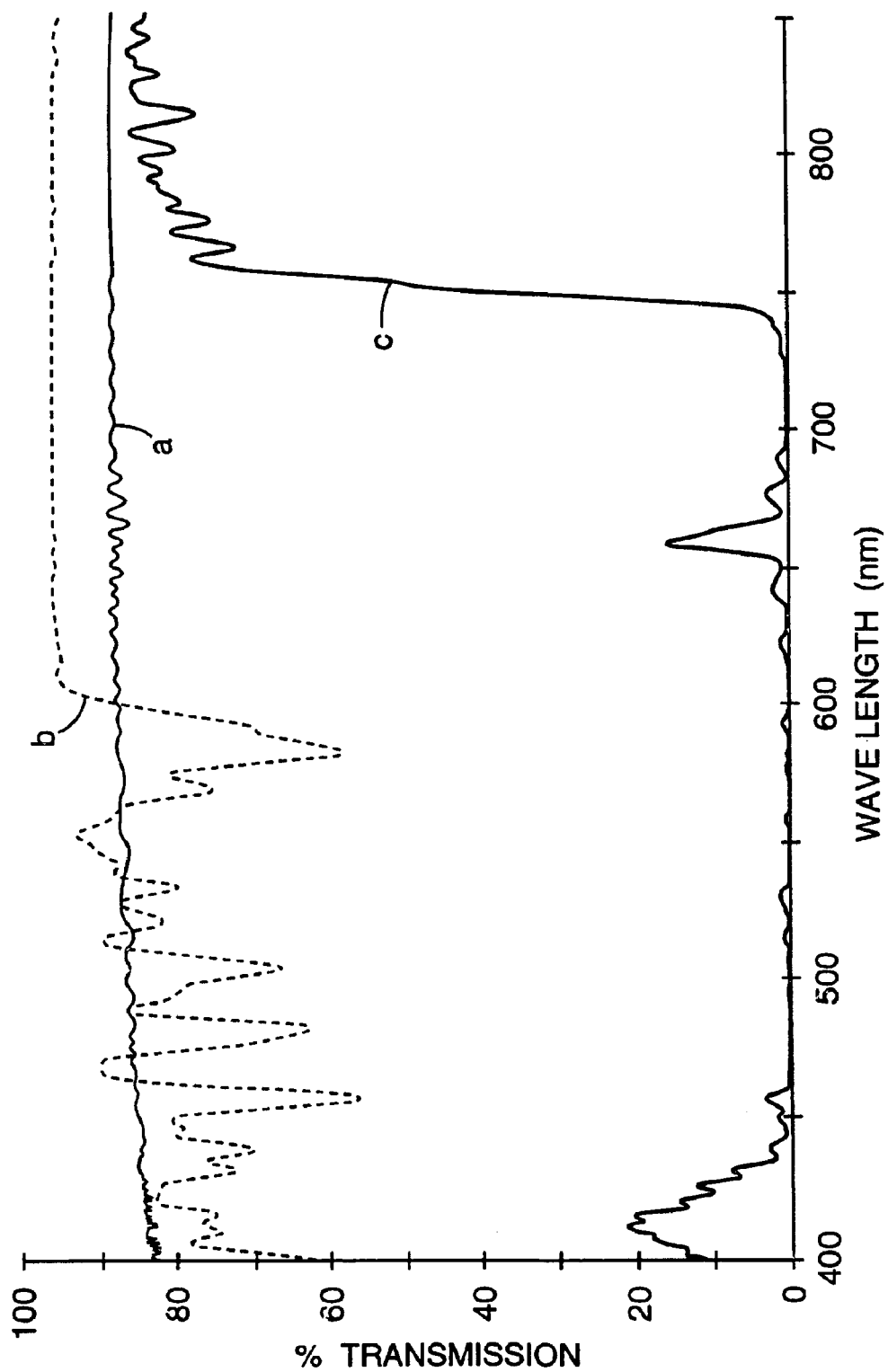

FIG. 7B shows the optical performance of the polarizer of Example 6. Curve a shows transmission of light polarized in the non-stretch direction at normal incidence, curve b shows transmission of p-polarized light in the non-stretch direciton at 50 degree angle of incidence, and curve c shows transmission of light polarized in the stretch direction at normal incidence. Note the very high transmission of light polarized in the non-stretch direction. Average transmission for curve a over 400–700 nm is 87%. Also note the very high reflectance of light polarized in the stretched direction in the visible range (400–700 nm) shown by curve c. The film has an average transmission of 2.5% for curve c between 400 and 700 nm. The % RMS color for curve b is 5%.

II. Backlight Systems Using Multilayer Optical Films

Backlight systems according to the present invention use multilayer optical films to reflect light. Reflectors constructed of multilayer optical film are most advantageously located around the light source as well as along the back surface of the light guide, although in some instances they may be used in one or the other location alone.

Figure 8:
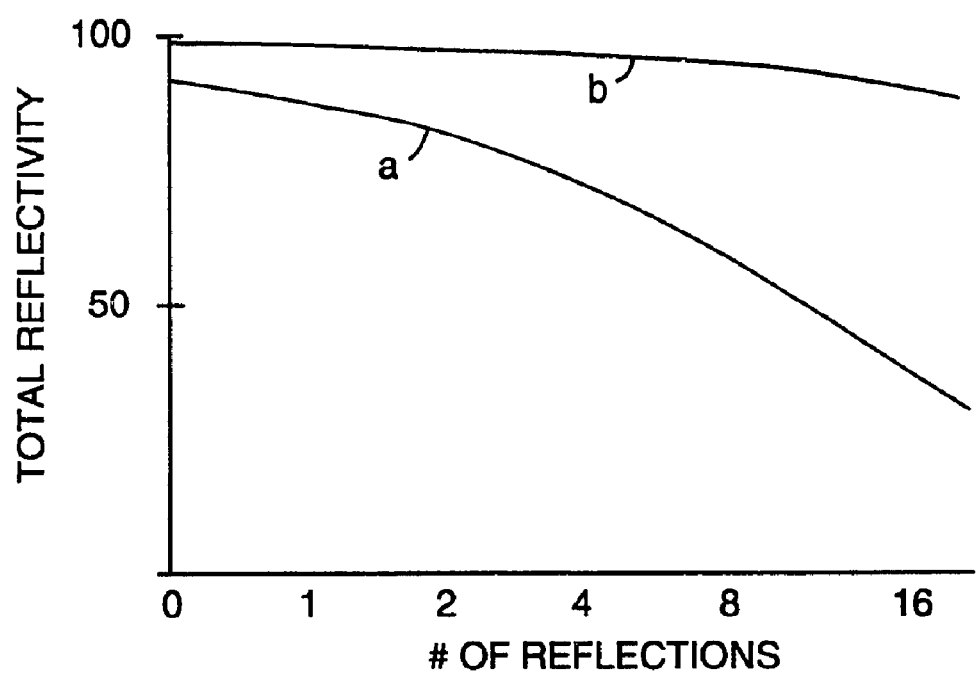
FIG. 8 is a graphical representation illustrating the relationship between the number of reflections experienced by a ray of light (x-axis) as compared to the relative intensity of the light ray (y-axis) for reflective surfaces made of multilayer optical film and a standard reflector.

The advantages of using multilayer optical film for reflectors in backlight systems are graphically illustrated in FIG. 8. Curve a shows the total reflectivity as a function of the number of reflections for a conventional reflector that has 96% reflectivity (i.e., about 4% of the light is absorbed at each reflection). As shown by curve a, the intensity of light which has been reflected from a conventional reflector decreases significantly after a relatively low number of reflections. In contrast, curve b shows the total reflectivity for a multilayer mirror film having a reflectivity of about 99.4%. Curve b clearly shows a much smaller decrease in reflectivity. The difference becomes especially pronounced after only 2–4 reflections.

For example, after five reflections, the intensity of light is about 97% for light reflected from multilayer optical films according to the present invention, while the intensity drops to about 81.5% for light reflected from a conventional reflector which is only about 3.5% less efficient. Although it is difficult to determine the average number of reflections experienced by light in a backlight system, the number of reflections can be expected to increase as uniformity and/or aspect ratio (defined more completely below) increase in any given backlight system. Those increased reflections would cause a significant loss in efficiency for backlight systems using conventional reflectors which would not be experienced in backlight systems employing multilayer optical film reflectors according to the present invention.

The practical value of this characteristic is that the efficiency of the backlighting systems and any display employing one is greatly enhanced resulting in increased brightness and/or contrast as compared to systems employing conventional reflectors. Put another way, the number of acceptable reflections for a given light ray in backlight systems employing multilayer optical film reflectors according to the present invention can be significantly increased without substantially impairing the overall output of the backlight system as compared to backlight systems employing conventional reflectors. Put another way, the probability that a photon will not be lost is increased in backlight systems employing optical film reflectors.

FIGS. 9–12 will now be described. The figures schematically depict various backlight systems manufactured according to the present invention, but are not intended to limit the scope of the present invention. For example, all of the figures depict light guides having essentially rectangular cross-sections. It will be understood, however, that the multilayer optical film reflectors can be used with any light guide including a lamp cavity reflector and/or a back reflector. Other examples of light guides include wedge-shaped guides, channeled guides, pseudo-wedge guides, etc.

Figure 9:
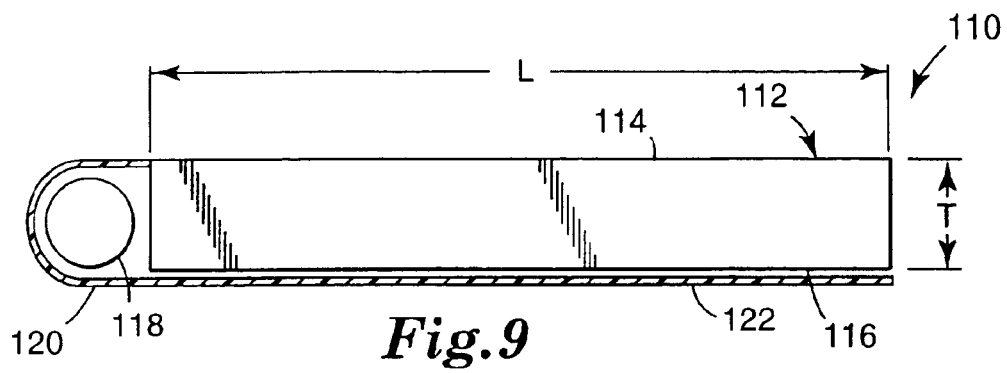
FIG. 9 is a schematic cross-sectional view of one backlight system according to the present invention.

FIG. 9 depicts, in a cross-sectional schematic view, an illustrative backlight system 110 which includes a light guide 112 and a light source 118. Light source 118 may be any source which emits light, such as a fluorescent lamp, incandescent lamp, solid state source, electroluminescent (EL) light source or any other source of visible light. Although the embodiments described below typically include one such source, it will be understood that a backlight system according to the present invention could include two or more individual sources located at the same or different positions and combining to provide the required amount of light.

In the preferred embodiments, the light source 118 comprises a source emitting light having randomized polarization. A reflective polarizer may be placed between the source and light guide such that light transmitted to the light guide 112 is substantially of one polarization orientation. The reflective polarization can be accomplished using bulk optics or a multilayer reflective polarizer, both of which are described in copending and commonly-assigned U.S. patent application Ser. No. 08/418,009, titled POLARIZED LIGHT SOURCES, filed on Apr. 6, 1995, which is incorporated herein by reference.

The light guide 112 includes a front surface 114 and a back surface 116. Components such as polarizers, diffusers, liquid crystal display panels, graphics films, prints and compensation/retarder films are typically placed above the front surface 114 of the light guide 112, are not depicted in FIG. 9 (or any of the backlight systems depicted in any of the figures) but will be well known to those skilled in the art and will not be described herein.

A lamp cavity reflector 120 is depicted as partially surrounding the light source 118 and coupling the same to the light guide 112. Conventional lamp cavity reflectors are constructed of a silvered film which exhibit reflectivities of about 96% for visible wavelengths, with the remaining light being substantially absorbed by the reflector. A lamp reflector 120 constructed using multilayer optical film according to the present invention, however, exhibits much higher reflectivities, typically about 98% or greater which significantly reduces losses. In addition, the presently described multilayer film has very high reflectivity, preferably at least 90%, more preferably 95%, and even more preferably at least 98%, at angles away from the normal (for example, greater than 45°). Since in many backlighting systems, such as those shown in FIGS. 9–12, the light enters from the side of the light guide, this is a distinct advantage.

It may be desirable to provide for increased lamp operating temperatures in which case the exterior surface of the reflector 120 can be coated with a metallic layer or an additional reflector can be provided (see reference number 224 in FIG. 10 and the description below). This can increase infrared reflectance as well as reduce convective cooling of the lamp 118.

Backlight systems incorporating multilayer optical film as the lamp cavity reflector 120 will typically exhibit approximately a 20% or greater increase in brightness when a silvered optical film lamp reflector 120 is replaced by multilayer optical film according to the present invention, when all other variables are constant. This increase can be largely attributed to the extremely low absorptivity and high reflectivity of the multilayer optical film.

In the backlight system 110, the lamp cavity reflector 120 is preferably integrated with the back reflector 122, either by laminating or similarly attaching the two pieces together or by using one continuous sheet for both functions. As a result, there are essentially no losses associated with the interface between the two reflectors 120 and 122. In addition, manufacturing of the backlight system 110 can be simplified by such a design. In addition, it maybe preferred in certain applications to laminate or otherwise similarly attach the back reflector to the back of the light guide 112. This eliminates the air gap between components, thus reducing surface reflections and increasing overall efficiency of the system.

The mechanism used to extract light from the light guide 112 is not depicted in FIG. 9 as any suitable mechanism could be used. Examples of extraction mechanisms include, but are not limited to: diffusing dots on the back surface 116 of light guide 112, channels in the back surface 116, the discontinuities associated with a pseudo-wedge light guide 112, and the increased reflected angles within a wedge-shaped light guide 112, and posts that adhere the reflector to the guide and provide light diffusion within the guide.

In the instance where a less efficient multilayer reflective film is used as the back reflector 122, it may be advantageous to provide the back surface layer 122, i.e., the surface facing away from the light guide 112, with a thin metal or other reflective coating to decrease transmissive losses through the multilayer optical film reflector 122, thereby improving the reflectivity of the multilayer optical film 122. It will of course, be understood that the metallic or other reflective coating may suffer from some absorption losses, but the fraction of light transmitted through the film 122 will typically be less than 5% (more preferably less than about 1%) of the total light incident on the film 122.

Another advantage of backlight systems 110 incorporating multilayer optical film for the back reflector 122 is in the flexibility for designing backlight systems which have relatively high aspect ratios. Aspect ratio can be defined as the inverse of the thickness of the backlight system as opposed to its length or surface area (in the case of a planar surface over which light is to be distributed).

In FIG. 9, thickness of the light guide 112 is depicted as T while the length of the light guide is depicted as L. That ratio, L/T can be significantly higher in backlight systems 110 according to the present invention due to the relative thinness and flexibility of the multilayer optical films. The aspect ratio can be higher because the number of reflections for any given light ray entering light guide 112 before it exits the backlight system 110 can be significantly higher without substantially degrading the overall light output of the backlight system 110 due to the low absorbance of the reflective surfaces provided by multilayer optical film back reflector 122. In contrast, the designer of a similar backlight system incorporating conventional reflectors which absorb incident light must be concerned with the number of reflections experienced by the light before exiting the backlight and the resulting absorptive losses.

Although both the lamp cavity reflector 120 and back reflector 122 of backlight system 110 are described as being constructed of multilayer optical film according to the present invention, it will be understood that only one of the reflectors 120 or 122 may be constructed of multilayer optical film while the other is constructed of conventional reflective materials. However, such a construction may not be preferred for certain applications due the absorption losses which would be experienced.

Figure 10:
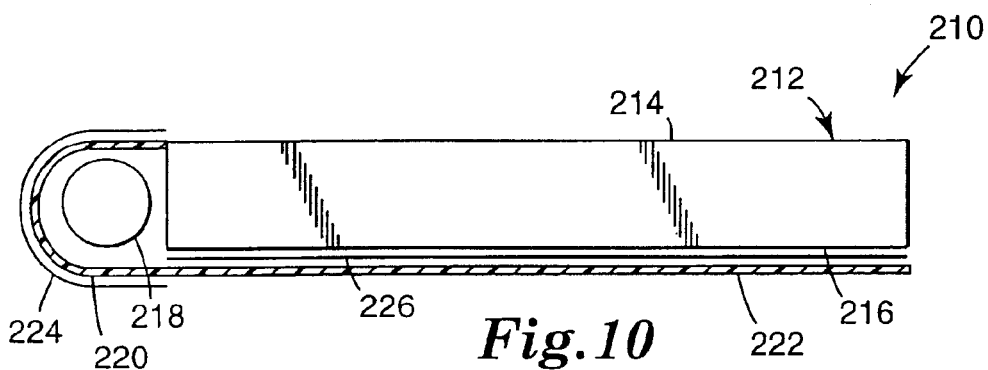
FIG. 10 is a schematic cross-sectional view of an alternate backlight system according to the present invention.

FIG. 10 depicts, in a cross-sectional schematic view, an illustrative backlight system 210 which includes a light guide 212 and a light source 218. The light guide 212 includes a front surface 214 and a back surface 216. A lamp cavity reflector 220 is depicted as partially surrounding the light source 218 and coupling the same to the light guide 212. In most respects, the construction of backlight system 210 is similar to the construction of system 110 described above.

Differences include the addition of a separate lamp cavity reflector 224 disposed about the outer surface of the multi-layer optical film lamp cavity reflector 220 to prevent transmissive losses in the event that a less efficient multi-layer optical film is used. However, if a very efficient, e.g. at least 97% reflective, film is used, the reflector 224 may not be required.

An additional layer 226 is depicted as interposed between the back reflector 222 and the back surface 216 of the light guide 212. That additional layer preferably comprises a means of diffusing light directed towards back reflector 222. A means of diffusing light may be helpful in some backlight systems because typical multilayer optical films provided as mirrors exhibit specular reflection which may be undesirable on some applications.

The diffusing means 226 can be provided in many different forms as long as it diffuses the specular component of light reflected from the multilayer optical film back reflector 222. It is preferred, however, that the diffusing means absorb a minimum amount of incident light, thereby reducing its impact on the performance of the backlight system 210. It may also be preferred that the diffusing means 226 is polarization preserving (as shown below with respect to FIG. 13) or polarization scrambling (as shown with respect to FIG. 14).

Other means of diffusing light could include loading diffusing particles, such as barium sulfate, in a coextruded skin layer located on the multilayer optical film back reflector 222. Alternately, the diffusing particles could be included within one of the layers in the stack, preferably near the surface on which light is incident. Diffusing layers could also be coated by extrusion coating on the multilayer optical film or they could be spread on the surface of the multilayer optical film using a suitable solvent.

Another diffusing means could comprise a commercially available diffusing film located between the multilayer optical film back reflector 222 and the back surface 216 of light guide 212. One example of a diffusing film is DFA-12, available from Minnesota Mining and Manufacturing Company, St. Paul, Minn.

In another variation, a diffusing adhesive could be used to attach the multilayer optical film back reflector 222 to the back surface 216 of the light guide 212. Exemplary diffusing adhesives are described below.

One exemplary diffusing adhesive can be made by forming acrylic/styrene beads and dispersing the beads in a water based emulsion adhesive. An adhesive containing 5% by weight of the microspheres, was coated out on a PET liner film and was dried to form an 8.4 grain/4"×6" adhesive layer. Diffusing adhesive was coated to 4 mils wet at 17 feet per minute. The drying oven was 30 feet in length. The drying temperature was 180° F.

Preparation of Styrene Particles 3 grams of poly(vinyl alcohol) and 9 grams of standapol-A (ammonium lauryl sulfate—Hercules) was dissolved in 480 grams of water. 2 grams of Lucidol™—75 (75% benzoyl peroxide—Elf Atochem) was dissolved in 120 g of styrene. The above two mixtures were blended and emulsified in a Gaulin homogenizer until the droplet size was approximately 2 microns. The emulsion was charged to a 1 liter reactor, heated to 80° C., degassed with argon and allowed to react for 12 hours.

Preparation of Pressure-Sensitve Adhesive Microparticles by Suspension Polymerization Method 1 gram of sodium dodecyl benzene sulfonate was dissolved in 360 grams of deionized water. 2.4 grams of poly(ethylene oxide)16 acrylate (PEO), 4.8 grams of acrylic acid and 1.05 grams of Lucidol™75 (75% benzoyl peroxide from Elf Atochem) were dissolved in 232.8 grams of iso-octyl acrylate (IOA). The above mixture was emulsified in a Gaulin homogenizer such that the droplet size was 1 micron or less. This emulsion was then charged to 1 liter reactor, stirred at 400 RPM and heated to 65° C. for 4 hours. The 97/2/1 IOA/AA/PEO resulting particles had a size of approximately 2 microns as viewed with an optical microscope and had an index of refraction of 1.47.

Light-Diffusing Adhesive Preparation 440 grams of the above Pressure Sensitive Adhesive Suspension was blended with 58 grams of the above poly (styrene) suspension, 1.5 grams of Triton GR-5M (Rohm & Haas) and 1.8 grams Polyphobe 104 (Union Carbide). The mixture was neutralized with ammonium hydroxide to a pH of 8.3. The diffuser adhesive solution was coated onto a PET release liner at 4 mils wet and dried at 65° C. for 10 minutes.

If it is desired to preserve the polarization of the light exiting from the backlight system 210, e.g., where a liquid crystal display is being illuminated and the light source 218 emits polarized light, the diffusing particles used in the system 210 should be as spherical as possible to preserve polarization.

Conversely, if the backlight system 210 is being used in conjunction with a multilayer or other type of reflective polarizing film (not shown) located above the front surface 214 to recycle light having the "wrong" polarization, it is desirable that the diffusing means also randomize polarization of the light to enhance that recycling process. An alternative construction is to use the polarization preserving diffuser and a birefringent film or skin layer to depolarize the light.

Figure 11A:
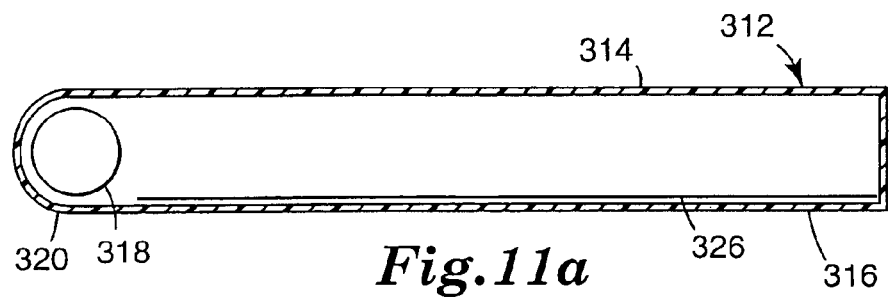
FIG. 11 is a schematic cross-sectional view of another alternate backlight system according to the present invention.

FIG. 11a depicts, in a cross-sectional schematic view, an alternate illustrative backlight system 310. This backlight system illustrates the construction of a backlight system without a separate light guide as described in the above systems. Light guides, which are typically constructed of materials such as acrylic, add weight to the backlight system. As described below, the multilayer optical films described above present the opportunity to construct a highly efficient backlight system 310 which does not require a separate light guide.

The backlight system 310 includes a front surface 314 and a back surface 316 as well as a light source 318 and a lamp cavity mirror 320. The system 310 also preferably includes a diffusing means 326 to diffuse light directed towards the back reflector 316. The diffusing means 326 should have varied amounts of diffusion across the back surface of the backlight to achieve uniform output.

The front surface 314 of the backlight system 310 can contain the extraction mechanism used to allow for the uniform transmission of light out of the front surface 314 of the backlight system 310.

Figure 11B:
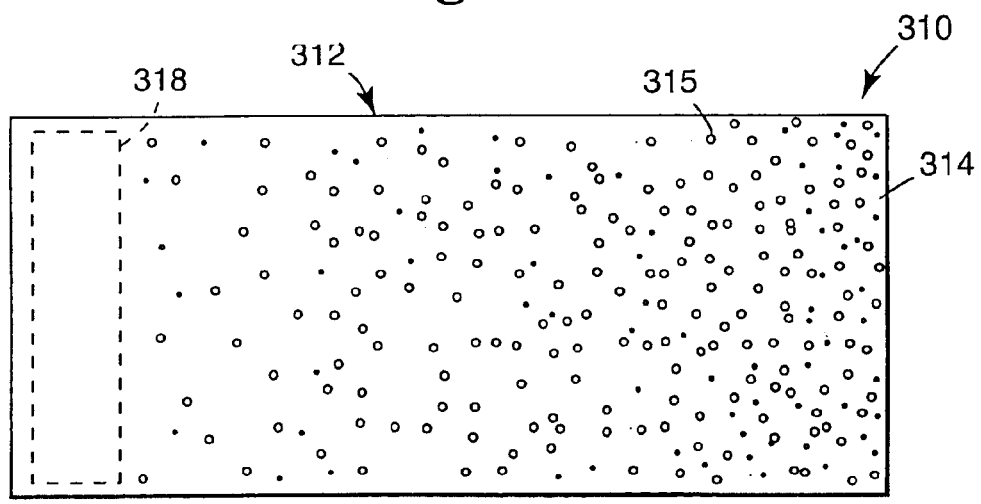

One useful extraction mechanism is to construct the front surface 314 from the multilayer optical film and to provide perforations or voids in the film 314 which allow light to exit the system 310. As shown in FIG. 11b, which is a plan view of the front of backlight system 310, it may be preferred in certain applications for the number and/or area of voids 315 to increase as distance from the light source 318 increases. In a system such as that depicted in FIGS. 11a and 11b, it may be desirable to place a diffusing layer above the front surface 314 to obscure the voids 315. If such a diffusing layer is provided, the diffusing layer 326 depicted as lying between front surface 314 and back reflector 316 may be unnecessary.

Figure 12:
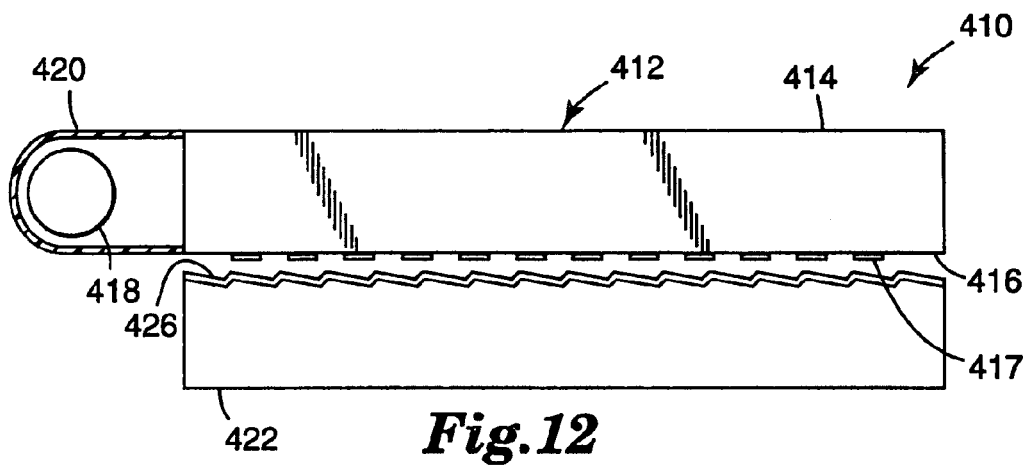
FIG. 12 is a schematic cross-sectional view of another alternate backlight system according to the present invention.

FIG. 12 is a cross-sectional schematic view, another alternate illustrative backlight system 410 which includes a light guide 412 and a light source 418. The light guide 412 includes a front surface 414 and a back surface 416. A lamp cavity reflector 420 is depicted as partially surrounding the light source 418 and coupling the same to the light guide 412. In most respects, the construction of backlight system 410 is similar to the construction of systems 110 and 210 described above. Light guide 412 is also depicted with diffusing extraction dots 417 located on its back surface 416, although any extraction mechanism could be used as described above.

One of the primary differences is that the multilayer optical film back reflector 422 is provided with a structured surface facing the back surface of the light guide 412. It is preferred that structured surface be designed to reflect light upward towards the front surface 414 of light guide 412 within a desired range of angles. This is particularly useful if the backlight system 410 will be used with a structured partially reflective film located in between the backlight and the viewer. Exemplary micro-replicated structured partially reflective films are available as Brightness Enhancement Film and Optical Lighting Film, both of which are available from Minnesota Mining and Manufacturing Company, St. Paul, Minn.

Structured partially reflective films typically have excellent reflectivity over certain ranges of angles but high transmission over others. Because the range of angles within which light is reflected from the structured back reflector 422 can be somewhat controlled, the use of back reflector 422 with a structured surface and a structured film (not shown) located above the backlight system 410 can reduce the number of reflections needed before light can be refracted through the structured film, thereby further limiting any absorptive losses in the system 410.

Another alternative to providing the structured surface directly in the back reflector 422, would be to interpose a layer of structured film between the back reflector and the back surface of the light guide.

Figure 13:
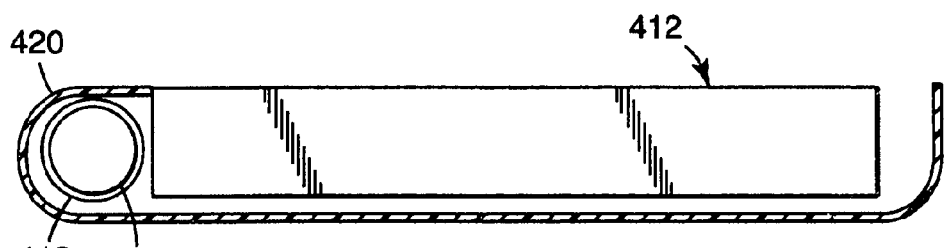
FIG. 13 shows a schematic cross-sectional view of another alternate backlight system according to the present invention.

When the reflective polarizer 419 is used to polarize light entering the guide 420, as shown in FIG. 13, then the guide, the light extracting dots and the reflective multilayer mirror 420 are preferably polarization preserving.

Figure 14:
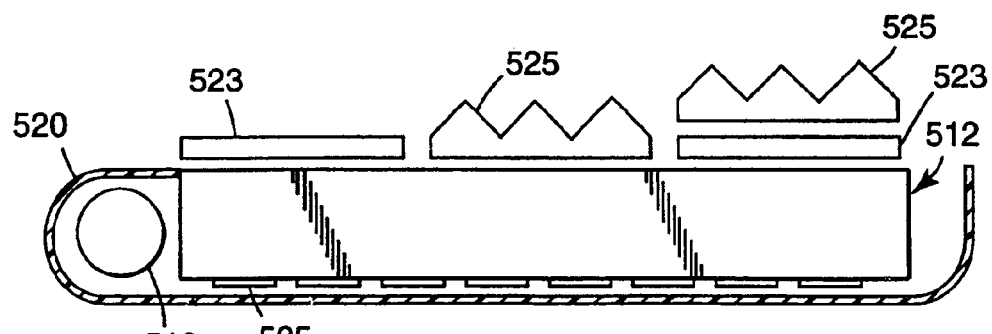
FIG. 14 shows a schematic cross-sectional view of another alternate backlight system according to the present invention.

In light recycling backlights such as that shown in FIG. 14, where reflective polarizers 523, brightness enhancement film 525 or combination thereof are placed on top of the light guide, the multilayer reflector 520 is preferably both diffuse scattering and polarization scrambling.

The present invention has been described above with respect to illustrative examples to which modifications may be made without departing from the scope of the invention as defined by the appended claims.

We claim:

1. A backlight system comprising:
    a) a light guide defining a back surface;
    b) a light source optically connected to the light guide, the light source emitting light into the light guide; and
    c) a back reflector proximate the back surface of the light guide, the back reflector comprising a multilayer optical film which reflects at least about 80% of normal light and at least about 80% of light incident at an angle of 60 degrees from normal.

2. A backlight system according to claim 1, wherein the back reflector reflects at least about 90% of normally incident light.

3. A backlight system according to claim 1, wherein the back reflector reflects at least about 95% of normally incident light.

4. A backlight system according to claim 1, wherein the back reflector reflects at least about 98% of normally incident light.

5. A backlight system according to claim 1, wherein the back reflector reflects at least about 99% of normally incident light.

6. A backlight system according to claim 1, wherein the back reflector reflects at least about 90% of the light incident at an angle of 60 degrees from normal.

7. A backlight system according to claim 1, wherein the back reflector reflects at least about 95% of the light incident at an angle of 60 degrees from normal.

8. A backlight system according to claim 1, wherein the back reflector reflects at least about 98% of the light incident at an angle of 60 degrees from normal.

9. A backlight system according to claim 1, wherein the back reflector reflects at least about 99% of the light incident at an angle of 60 degrees from normal.

10. A backlight system according to claim 1, further comprising diffusing means for diffusing light reflected from the back reflector towards the back surface of the light guide.

11. A backlight system according to claim 10, wherein the diffusing means comprises diffusing particles within at least one layer of the multilayer optical film.

12. A backlight system according to claim 10, wherein the diffusing means comprises diffusing particles located on a surface of the multilayer optical film.

13. A backlight system according to claim 10, wherein the diffusing means comprises a diffusing film located between the back reflector and the back surface of the light guide.

14. A backlight system according to claim 1, wherein the back surface of the light guide is formed by the back reflector.

15. A backlight system according to claim 1, further comprising a lamp cavity reflector located about at least a portion of the light source, the lamp cavity reflector directing light from light source generally towards an edge of the light guide, the lamp cavity reflector further comprising a multilayer optical film which reflects at least about 80% of normal light and at least about 80% of light incident at an angle of 60 degrees from normal.

16. A backlight system according to claim 15, wherein the lamp cavity reflector reflects at least about 90% of normally incident light.

17. A backlight system according to claim 15, wherein the lamp cavity reflector reflects at least about 95% of normally incident light.

18. A backlight system according to claim 15, wherein the lamp cavity reflector reflects at least about 98% of normally incident light.

19. A backlight system according to claim 15, wherein the lamp cavity reflector reflects at least about 99% of normally incident light.

20. A backlight system according to claim 15, wherein the lamp cavity reflector reflects at least about 90% of the light incident at an angle of 60 degrees from normal.

21. A backlight system according to claim 15, wherein the lamp cavity reflector reflects at least about 95% of the light incident at an angle of 60 degrees from normal.

22. A backlight system according to claim 15, wherein the lamp cavity reflector reflects at least about 98% of the light incident at an angle of 60 degrees from normal.

23. A backlight system according to claim 15, wherein the lamp cavity reflector reflects at least about 99% of the light incident at an angle of 60 degrees from normal.

24. A backlight system comprising:
a) a light guide defining a back surface;
b) a light source optically connected to the light guide, the light source emitting light into the light guide;
c) a back reflector proximate the back surface of the light guide, the back reflector comprising a multilayer optical film which reflects at least about 90% of normal light and at least about 80% of light incident at an angle of 60 degrees from normal; and
d) a lamp cavity reflector located about at least a portion of the light source, the lamp cavity reflector directing light from light source generally towards an edge of the light guide, the lamp cavity reflector further comprising the multilayer optical film.

25. A backlight system according to claim 24, further comprising diffusing means for diffusing light reflected from the back reflector towards the back surface of the light guide.

26. A backlight system according to claim 1, wherein the multilayer optical film further comprises:
(a) a first layer comprising an oriented birefringent polymer, the first layer having an average thickness of not more than about 0.5 microns; and
(b) a second layer of a selected second polymer, each second layer having an average thickness of not more than 0.5 microns.

27. A backlight system according to claim 26, wherein the first layer of the multilayer optical film comprises a crystalline naphthalene dicarboxylic acid polyester.

28. A backlight system according to claim 26, wherein the multilayer optical film comprises a plurality of the first and second layers, wherein one of the second layers is located between each adjacent pair of first layers.

29. A backlight system according to claim 28, wherein the first and second layers of the multilayer optical film are adhered to each other.

30. A backlight system according to claim 26, wherein the multilayer optical film comprises at least fifty of each of the first and second layers.

31. A backlight system according to claim 26, wherein the oriented birefringent polymer has been stretched in at least two in-plane directions.

32. A backlight system according to claim 26, wherein the oriented birefringent polymer is more birefringent than the second polymer, and further wherein the refractive index of one polymer is higher than the other polymer.

33. A backlight system according to claim 32, wherein the higher index of refraction is at least 0.05 higher.

34. A backlight system according to claim 32, wherein the higher index of refraction is at least 0.10 higher.

35. A backlight system according to claim 32, wherein the higher index of refraction is at least 0.20 higher.

36. A backlight system according to claim 27, wherein the naphthalene dicarboxylic acid polyester is a poly(ethylene naphthalate).

37. A backlight system according to claim 27, wherein the naphthalene dicarboxylic acid polyester is a copolyester comprising naphthalate units and terephthalate units.

38. A backlight system according to claim 27, wherein the second polymer is a polyester.

39. A backlight system according to claim 38, wherein the second polymer comprises naphthalene units.

40. A backlight system according to claim 38, wherein the second polymer is a copolyester comprising naphthalate units and terephthalate units.

41. A backlight system according to claim 27, wherein the second polymer is a polystyrene.

42. A backlight system according to claim 27, wherein the second polymer is a fluoropolymer.

43. A backlight system according to claim 27, wherein the second polymer is a polyacrylate, polymethacrylate, or polyolefin.

44. A backlight system comprising:
a) a light guide defining a back surface;
b) a light source optically connected to the light guide, the light source emitting light into the light guide;
c) a back reflector proximate the back surface of the light guide, the back reflector comprising a multilayer optical film which reflects at least about 90% of normal light and at least about 80% of light incident at an angle of 60 degrees from normal, the multilayer optical film further comprising:
(1) a first layer comprising a biaxially oriented birefringent polymer, the first layer having an average thickness of not more than about 0.5 microns; and
(2) a second layer of a selected second polymer, each second layer having an average thickness of not more than 0.5 microns; and
d) a lamp cavity reflector located about at least a portion of the light source, the lamp cavity reflector directing light from light source generally towards an edge of the light guide, the lamp cavity reflector further comprising the multilayer optical film.

45. A backlight system comprising:
a) a light guide defining a back surface;
b) a light source optically connected to the light guide, the light source emitting light into the light guide; and
c) a lamp cavity reflector located about at least a portion of the light source, the lamp cavity reflector directing light from light source generally towards an edge of the light guide, the lamp cavity reflector further comprising a multilayer optical film which reflects at least about 80% of normal light and at least about 80% of light incident at an angle of 60 degrees from normal.

46. A backlight system according to claim 45, wherein the lamp cavity reflector reflects at least about 90% of normally incident light.

47. A backlight system according to claim 45, wherein the lamp cavity reflector reflects at least about 95% of normally incident light.

48. A backlight system according to claim 45, wherein the lamp cavity reflector reflects at least about 98% of normally incident light.

49. A backlight system according to claim 45, wherein the lamp cavity reflector reflects at least about 99% of normally incident light.

50. A backlight system according to claim 45, wherein the lamp cavity reflector reflects at least about 90% of the light incident at an angle of 60 degrees from normal.

51. A backlight system according to claim 45, wherein the lamp cavity reflector reflects at least about 95% of the light incident at an angle of 60 degrees from normal.

52. A backlight system according to claim 45, wherein the lamp cavity reflector reflects at least about 98% of the light incident at an angle of 60 degrees from normal.

53. A backlight system according to claim 45, wherein the lamp cavity reflector reflects at least about 99% of the light incident at an angle of 60 degrees from normal.

* * * * *

UNITED STATES PATENT AND TRADEMARK OFFICE
CERTIFICATE OF CORRECTION

PATENT NO. : 6,905,220 B2
DATED : June 14, 2005
INVENTOR(S) : Wortman, David L. et al.

It is certified that error appears in the above-identified patent and that said Letters Patent is hereby corrected as shown below:

Title page,
Item [56], References Cited, FOREIGN PATENT DOCUMENTS, below "WO    WO 94/11776   5/1994" insert -- WO    94/29765    12/1994 --.
OTHER PUBLICATIONS,
"Weber" 3$^{rd}$ occurrence, delete "Birefringement" and insert -- Birefringent -- therefor.

Column 5,
Line 2, after "reflectance" delete ",".

Column 6,
Line 25, delete $^{Tis}$" and insert -- T is --, therefore.

Column 12,
Line 1, delete "direciton" and insert -- direction --, therefor.

Column 16,
Line 1, delete "Pressure-Sensitve" and insert -- Pressure-Sensitive --, therefore.

Signed and Sealed this

Sixteenth Day of August, 2005

JON W. DUDAS
*Director of the United States Patent and Trademark Office*